Sept. 1, 1942.   J. W. BRYCE   2,294,734

STATISTICAL MACHINE

Original Filed May 11, 1938   6 Sheets-Sheet 1

INVENTOR
James W. Bryce
BY
W. M. Wilson
ATTORNEY

Sept. 1, 1942.  J. W. BRYCE  2,294,734
STATISTICAL MACHINE
Original Filed May 11, 1938  6 Sheets-Sheet 2
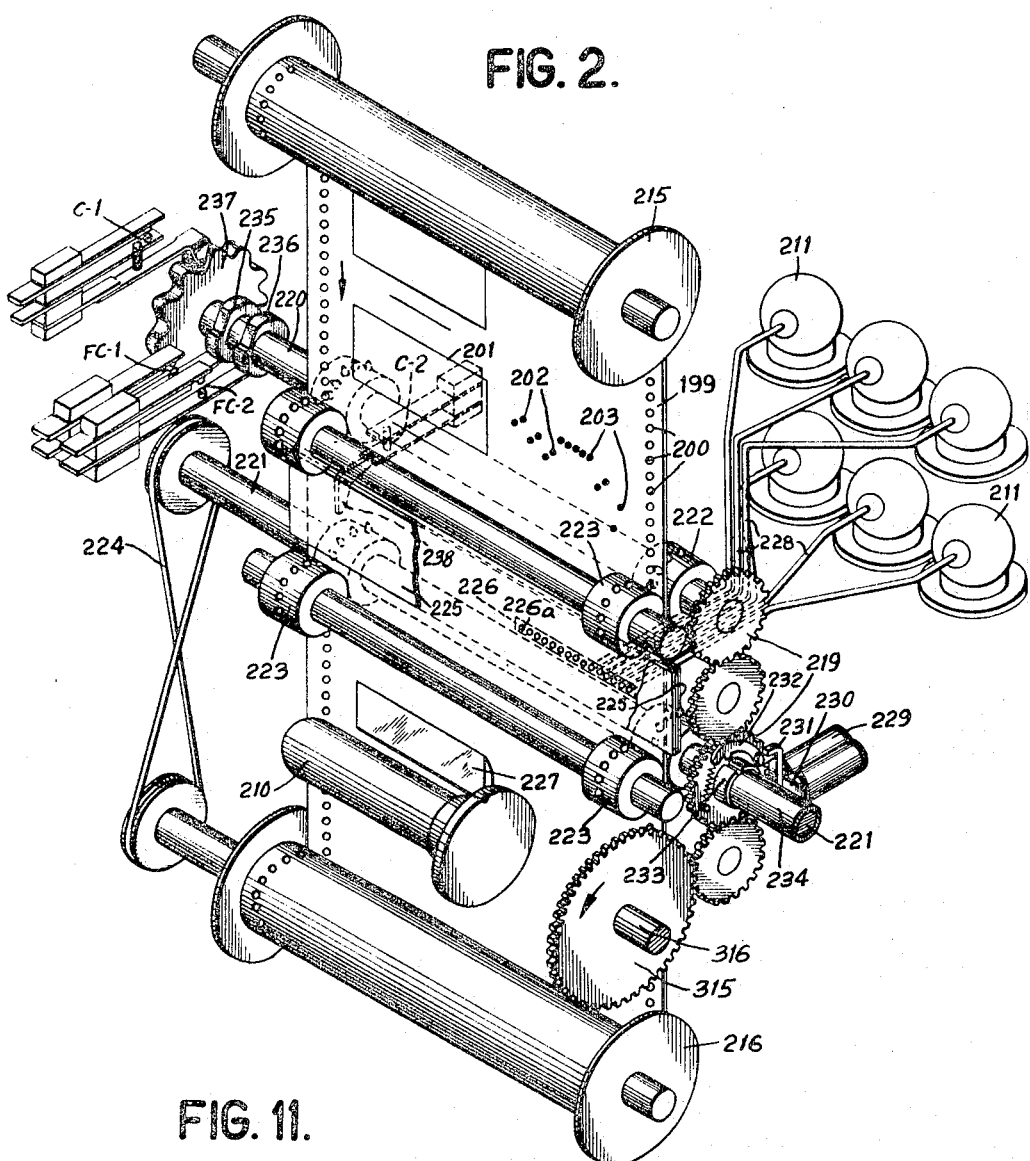
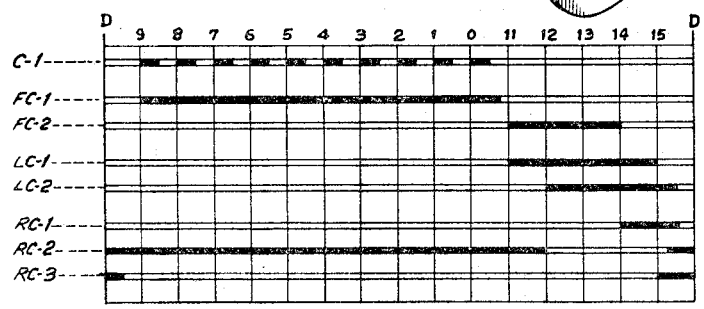
INVENTOR
James W. Bryce
BY
ATTORNEY Sept. 1, 1942.   J. W. BRYCE   2,294,734
STATISTICAL MACHINE
Original Filed May 11, 1938   6 Sheets-Sheet 3

INVENTOR
James W. Bryce
BY
ATTORNEY

Sept. 1, 1942.    J. W. BRYCE    2,294,734
STATISTICAL MACHINE
Original Filed May 11, 1938    6 Sheets-Sheet 4

INVENTOR
James W. Bryce
BY
W. M. Wilson
ATTORNEY

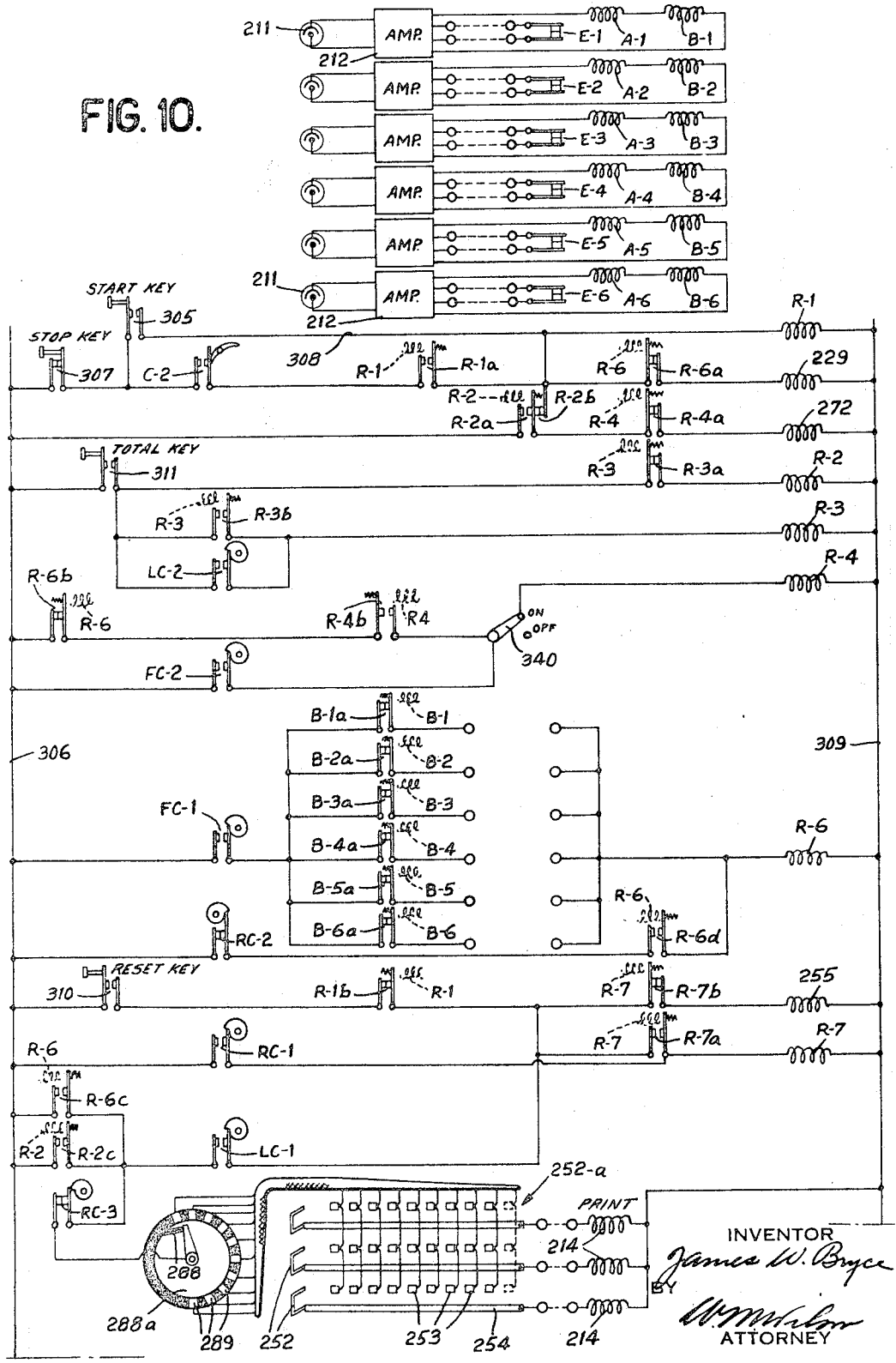

Patented Sept. 1, 1942

2,294,734

UNITED STATES PATENT OFFICE 2,294,734

STATISTICAL MACHINE

James W. Bryce, Glen Ridge, N. J., assignor to International Business Machines Corporation, New York, N. Y., a corporation of New York Original application May 11, 1938, Serial No. 207,281. Divided and this application March 6, 1941, Serial No. 381,939

4 Claims. (Cl. 235—61.7)

This invention relates to record controlled statistical machines, and is a division of the copending application Serial No. 207,281, filed May 11, 1938.

An object of the present invention resides in the provision of improved means for modifying the operations of the record feeding means upon disagreement of the classification data on successive records.

To this end, provision is made whereby photographic film records are presented to a single sensing station to modify light rays in accordance with the disposition of the data designations, which modified light rays, in turn, control the conditioning of light responsive means accordingly. Suitable storing means are provided for storing, each cycle, the data sensed on successive records. The said sensing and storing means are effective, jointly, for selectively controlling the conductivity of electron discharge means in accordance with the relationship of the compared classification data on successive records, which discharge means, in turn, are effective to control the operations of the record feeding means.

Accordingly, another object of the present invention resides in the provision of electron discharge means which are jointly controlled by the data sensing and storing means for controlling the conductivity thereof, and, in turn, the operations of the record feeding means.

Other objects of the invention will be pointed out in the following description and claims and illustrated in the accompanying drawings, which disclose, by way of example, the principle of the invention and the best mode, which has been contemplated, of applying that principle.

In the drawings:

Figs. 2, 3 and 4 show diagrammatically the control units of the statistical machine when arranged as shown in Fig. 8 and wherein Fig. 2 shows the film control record advancing means and sensing means, Fig. 3 shows the data accumulating means and Fig. 4 shows the data recording unit.

Figure 12:
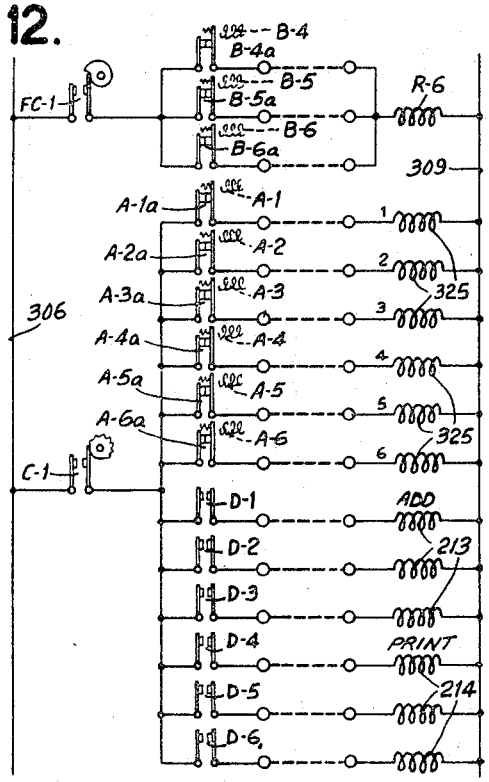
Figure 9:
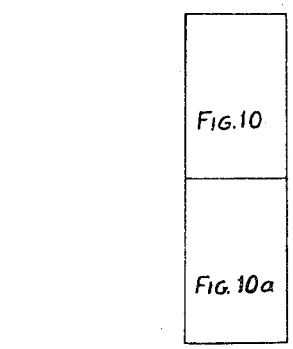
Figure 10A:
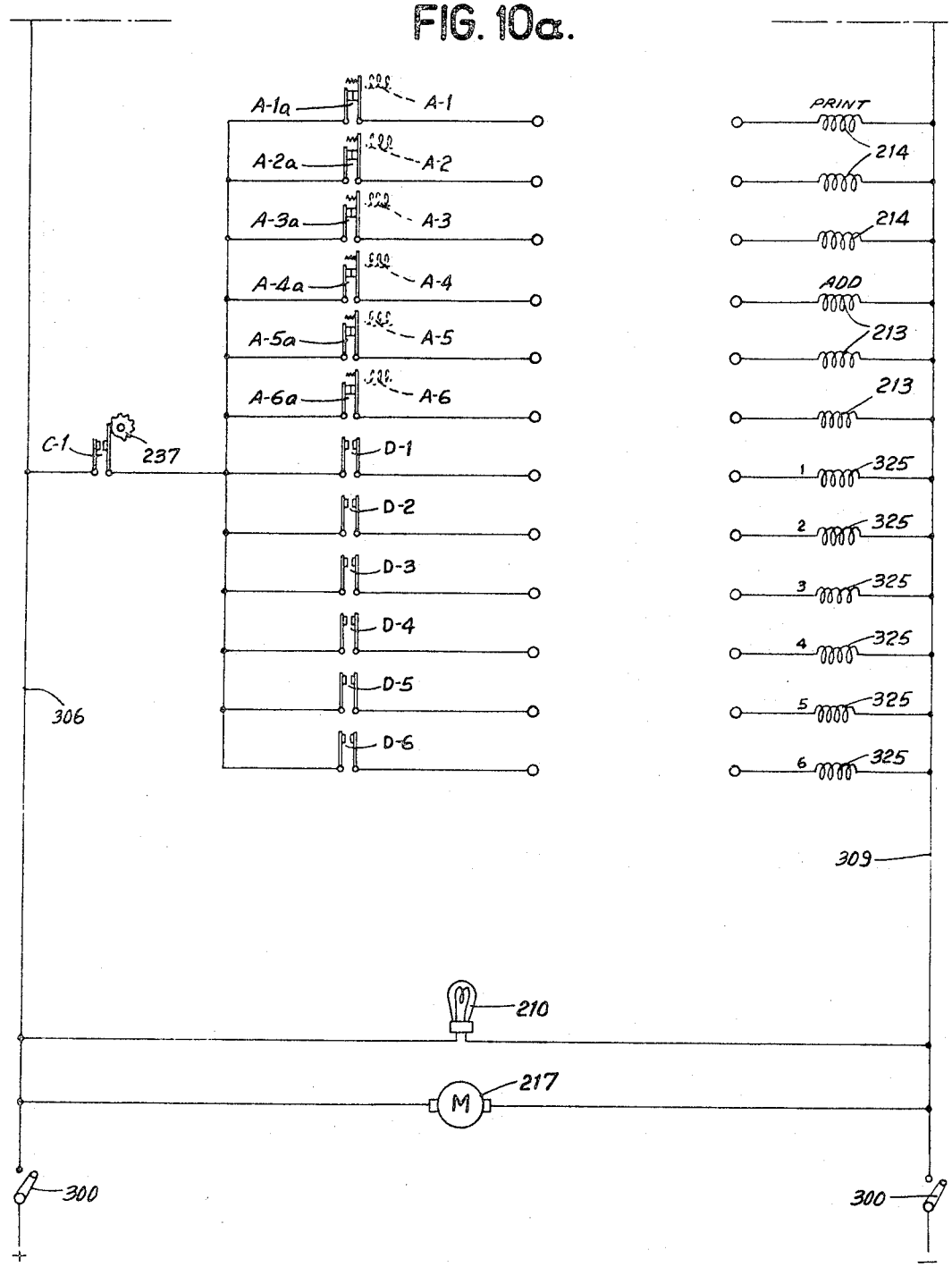

Figs. 10 and 10a when arranged as shown in Fig. 9 show a method of connecting certain of the control elements of the statistical machines;

Fig. 11 is a timing chart of the operations of certain of the control elements of the machine;

Fig. 12 shows a plugging arrangement of certain of the control elements shown in Figs. 10 and 10a.

Control record

The control record, embodied in the present invention is disclosed and described in detail in U. S. Patent No. 2,124,906, and referring to Fig. 1, herein, is shown to comprise a photographic film record 199 having the usual feed apertures 200, a photographic facsimile representation of a document, such as a bank check, indicated by the reference character 201, and the data designations in the form of control spots 202 and 203.

Figure 1:
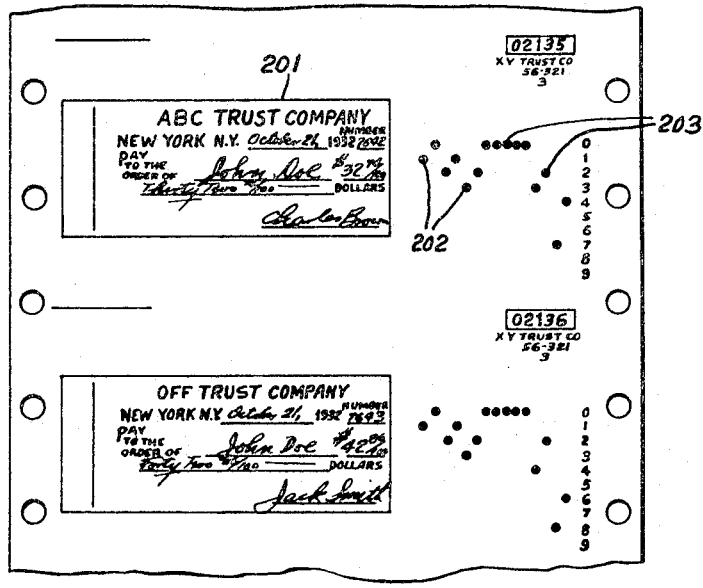
Fig. 1 represents an enlarged view of a fragmentary section of a transparent photographic film controlling element of a statistical machine.

The data designations 202 and 203 are photographic machine control spot representations, and each set of numerical data comprises one or more control spots in such relative position upon the film record as to represent, by their relative position thereon, the numerical control value thereof. In practice and according to the embodiment shown, the control spots are shown on the film, in index point relation, in general conformance with the manner in which index perforations are disposed on perforated record cards in the Hollerith accounting system. That is, the differential position of a control spot delineates the numerical value of a particular numeral. In Fig. 1, the data represented by control spots 202 may be indicative of certain classification data, and can be used to represent a date, or a depositor's number, or the like. The data represented by the control spots 203 may indicate an amount, and for illustrative purposes, these amount designations represent the amounts indicated in the related facsimile documents 201.

It will be understood, that the completed film has photographic reproductions thereon at successively spaced intervals along the film, as shown, accordingly, a large quantity of statistical information can be placed on an extremely small controlling record.

Film advancing and data sensing means

In Fig. 2, the film record 199 is shown disposed on a supply reel 215 and attached to a driven take-up reel 216. The film is advanced through the agency of the motor 217, by means of the driving connections generally designated 218 and 219. The driving connections 219 are secured to the shafts 220 and 221 which have suitable advancing sprockets 222 disposed thereon, and which extend through the apertures 200 of the film to cooperate with the complementary rollers 223. A flexible driving connection is provided between shaft 221 and the take-up reel 216 generally designated 224. It is seen now that by means of the described driving mechanism the film record may be advanced so as to be fed through the guide plates 225 to present the different data representations thereon to a sensing position generally designated 226 where the representations are analyzed in the following manner.

The rays of light emanating from the light source 210 are directed upon the film record 199 at the sensing position 226 by means of a suitable condenser 227. The guide plates 225 extend across the entire width of the film and are disposed on both sides thereof. Each of the said plates is provided with a series of apertures 226—a disposed in a transverse line with respect to the film. The apertures are so spaced as to be disposed opposite the individual rows where control spots may appear upon the film record, and are of such dimensions so as to be substantially the same as the control spots. Associated with the film record and in close proximity thereto are suitably disposed a plurality of light conducting quartz rods 228 which extend individually to the light responsive devices or cells 211. The said rods are positioned so that a rod may be provided for each row of control spots disposed on the film, and are arranged so as to extend into the apertures 226—a provided in the associated guide plate 225. Consequently, when there are no control spots interposed between the light source and the light responsive devices or stated in other words, when no control spots are presented to the sensing station or apertures in the guide plates, the rays of light are conducted by each rod to the corresponding light responsive devices to affect the devices in a definite manner. However, whenever a control spot or group of control spots are presented to the sensing station, the said spot or spots are effective to block off at that position the light from the corresponding rod or rods to affect the action of the associated light responsive devices in a different manner. The operation of the control circuits associated with the light responsive devices will be described hereinafter.

Figure 3:
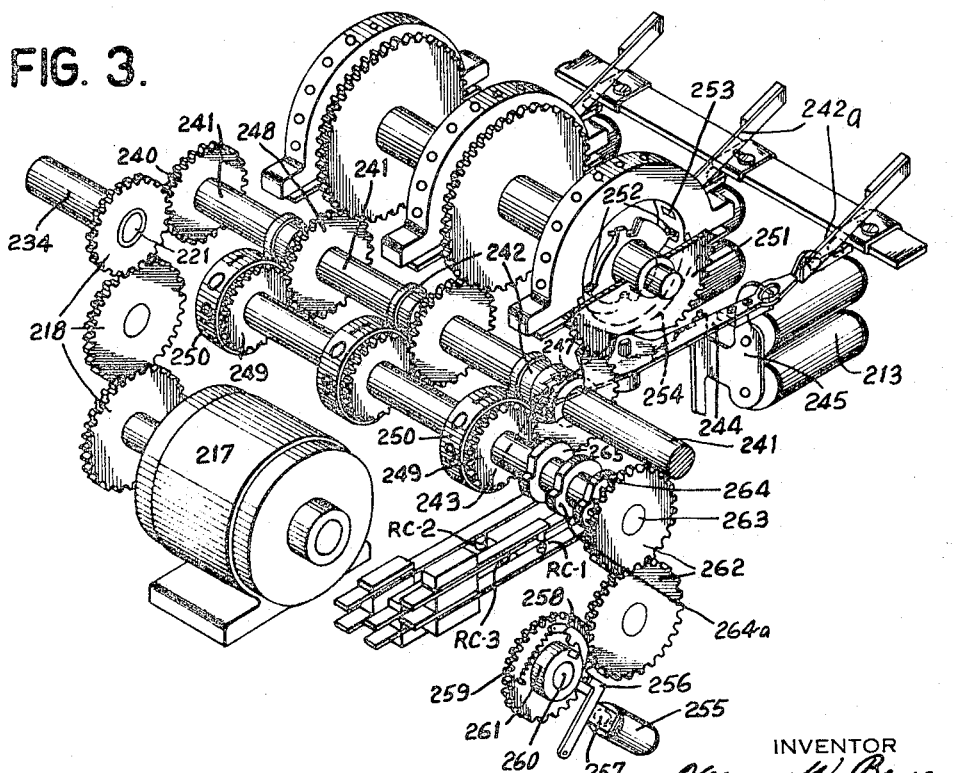

Different control devices associated with and forming part of the film advancing means will now be described. A film feed clutch magnet 229 (Fig. 2) is provided to control the feeding or advancing of the film record. Suitably secured to the armature 230 of the said magnet is a stop lever 231 adapted to cooperate with an extension of a pivoted dog member 232 which is mounted on one of the gears of the driving connections designated 219 as shown in the figure. The said dog member when released (upon energization of the magnet 229) cooperates with the clutch member 233 secured to sleeve 234, which sleeve is secured to the upper and associated gear of the driving connections designated 218 (Fig. 3). The said gear, sleeve and clutch member are rotatably supported on shaft 221 and rotated continuously as long as the motor 217 is operated. Upon energization of the control magnet 229 the dog 232 is released by the displaced stop lever 231, to engage the clutch member 233 thereby rotating the shafts 220 and 221 in unison with the clutch member, by means of the gearing 219. Rotation of the said shafts is now effective to advance the film record 199 from the supply reel 215 to the driven take-up reel 216. Cams 235 and 236 are provided and secured to shaft 220 to control the operation of suitably disposed cam operated contacts FC—1 and FC—2 respectively. An additional cam member 237 is provided and secured to the said shaft to operate the associated controlled contacts C—1. The said cam member is provided with a plurality of suitable camming surfaces capable of operating the said associated contacts each time the film is advanced to present to the sensing station a different incremental area of the film record where one or more of the control spots may appear upon the film record. The different control spots are disposed in the proper position in each individual frame of the film record so as to maintain the timing arrangement described between the said areas where control spots may appear on the film and the cam member 237. The purpose of the cam controlled contacts will be understood as the description progresses. In addition, it should be stated that control contacts C—2 are provided and suitably disposed so as to be operated by the control lever 238. According to the instant arrangement the said lever is arranged to maintain the contacts C—2 closed as long as the film record is advanced past the lever. In the event of breakage of the film or that the film supply is exhausted, the said lever is then effective to swing out into the plane normally occupied by the film to permit the contacts C—2 to be opened.

*Data accumulating means*

The data accumulating means (Fig. 3) to be described is operated in synchronism with the film advancing means by means of the gear 240, secured to the shaft 241, engaging the main driving connections designated 218. Shaft 241, therefore, is rotated continuously as long as motor 217 is operated, and in timed relationship with the rotation of shafts 220 and 221 (Fig. 2).

The continuously rotated shaft 241 has slidably mounted thereon but keyed for rotation therewith a plurality of clutch elements 242, there being one for each denominational order of the accumulator. The element 242 is provided with a groove in which fits the end of an arm 243 of a suitably pivoted lever 244. The said lever is normally held in the position shown by armature 245 of the control magnet 213. Upon energization of the control magnet the associated armature is attracted thereto, thereby releasing the lever 244 which is positioned by the leaf spring 242a to cause the clutch element 242 to move into engagement with cooperating teeth 247 integral with a gear 248 loosely mounted on shaft 241. Gear 248, when thus coupled to shaft 241, will rotate a gear 249 which meshes therewith and displace the associated accumulator index wheel 250. Also driven by gear 248 is a gear 251 which is displaced in the same manner as index wheel 250. The ratio of gears 249 and 251 is one to two so that the latter will turn through half a revolution for each revolution of the former gear. Carried by and insulated from gear 251 is a pair of electrically connected brushes 252, one of which cooperates successively with the conducting segments 253 while the other cooperates with an arcuate conducting strip 254. The relationship of the parts is such that, when the index wheel 250 is in its zero position, one of the brushes 252 is in contact with the zero segment and the other brush is in contact with the conducting strip, thus forming an electrical connection between the two. The positioning of the said brushes provides a convenient electrical readout mechanism for controlling total printing operations and the electrical circuits involved in these operations will be more fully explained in connection with the circuit diagram.

It is to be understood that the control magnets 213 may be energized at various points in the cycle of the machine, depending upon the disposition of the control spots upon the film detected by the sensing means. This energization may take place in response to the detection of a control spot in any of the index point positions represented by the accumulator. The control spots are disposed on each frame of the film in such a manner, and the film advancing means and accumulator are operated in such timed relationship that, for example, a control spot sensed in the "9" position, indicated on the film, will cause the clutch element 242 to be tripped to position the index wheel 250 and brushes 252 nine steps before a declutching operation is effected by the control elements of the machine, and the sensing of a control spot in the "1" position will cause the clutch element to be tripped to position the said index wheel and brushes one step before declutching thereof. For further detailed description of the accumulating mechanism reference should be made to the said U. S. Patent No. 1,976,617 and wherein such well known accumulator operations, as denominational order transfer, restoration of the clutch elements and magnet armatures to normal position and resetting of the accumulator mechanism, are specifically described.

The resetting mechanism is shown diagrammatically to comprise a reset clutch magnet 255, normally deenergized, thereby positioning the stop lever 256, secured to the magnet armature 257, to engage the extension finger of the pivoted dog member 258 disposed on gear 259. The said gear is loosely mounted on the continuously rotated shaft 260 to which is secured a clutch member 261, so that upon energization of the reset clutch magnet the said dog member is released to engage the rotating clutch member thus rotating the gear 259 in unison therewith. By means of the driving connections designated 262, shaft 263 is rotated to reset the individual index wheels 250 to the normal zero position in a manner well known and described in detail in the said last mentioned patent. Control cams 264, 264—a and 265 are secured to shaft 263 and rotated thereby to operate the suitably disposed contacts RC—1, RC—2 and RC—3 for various control purposes to be described hereinafter.

Data printing means

Figure 4:
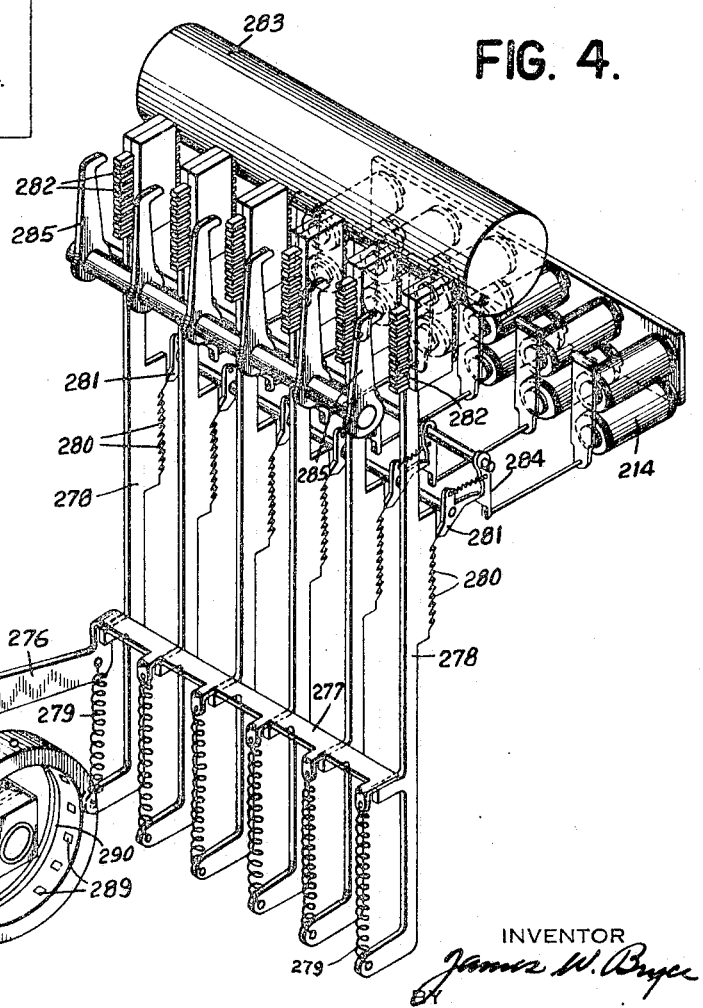

The printing or listing unit (Fig. 4) comprises a printing control cam 270 secured to the sleeve 271 rotatably supported by the shaft 241 which is rotated in synchronism with the film record feed mechanism making one revolution for each individual frame fed and analyzed, whenever the list clutch magnet 272 is energized to release the pivoted dog member 273, supported by member 274 which is secured to sleeve 271, to engage the clutch member 275 secured to shaft 241 and continuously rotated thereby rotating the printing cam in unison with the shaft 241.

The member 276 is shown to cooperate with and be actuated by a cam groove in the printing cam so that the printing bail or member 277 is effective to impart an upward movement to the typebars 278 by means of the resilient connections such as springs 279 between the typebars and the printing bail. The typebars are provided with a plurality of ratchet teeth 280 which cooperate with stopping pawls 281 so that the typebars may be interrupted at various positions to present any of their type elements 282 to the printing platen 283 for cooperation therewith.

By virtue of the said spring connections, the typebars may be interrupted without interfering with the upward movement of the printing bail which has an invariable extent of movement controlled by the printing cam. Energization of any one of the control magnets 214 is effective to rock the spring-pressed pivoted latch 284 releasing the associated pawl 281 so that it may swing into engagement with teeth 280 and interrupt the further upward movement of the corresponding typebar 278. The energization of the printing control magnets may be controlled directly by the sensing means upon detection of the control spots on the film record, and due to the synchronization of the typebar travel with the passage of the control spots by the sensing station will present the type elements 282, corresponding to the data control spots, in printing position.

Associated with each typebar 278 is a printing hammer 285 which is adapted to be positioned to strike the type elements 282 which are now in printing position to effect printing therefrom. The printing hammers are adapted to be actuated immediately after the positioning of the member 276 to the upper extremity of its movement. The detailed operation of the printing mechanism just described is well known and also is completely described in the said last mentioned patent, so that further disclosure of the mechanism is deemed unnecessary.

It should be mentioned at this time that control cams 286 and 287 are provided and secured to sleeve 271 to operate the suitably disposed controlled contacts LC—1 and LC—2 respectively. Also, carried by the extremity of the sleeve 271 and insulated therefrom are pairs of electrically connected brushes 288, one brush of which engages the conducting segments 289 while the other engages a common arcuate conducting strip 290. The timing is such that a brush 288 successively engages each of the segments 289 as a corresponding type element 282 approaches the printing position opposite platen 283. These contact devices, generally known as "total printing emitters," control the total printing circuits in a manner to be more fully explained hereinafter. It is to be noted, during the description to follow, that the mentioned LC contacts and emitter are operated only during printing operations.

Data storing means

Figure 7:
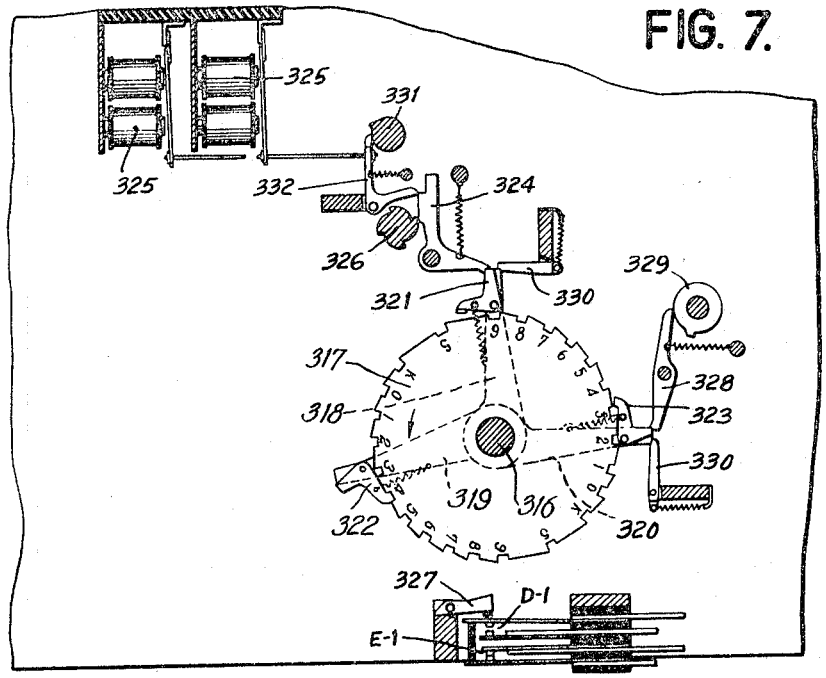
Fig. 7 is a diagrammatic view showing the storing means adapted to be controlled by the film control records.

Referring now to Fig. 7 the data storing means will be described. The driving connections 219 are effective to rotate the associated gear 315 and shaft 316 whenever the film feeding mechanism is rendered operative. The said shaft is driven at a definite rate relative to the movement of the film record and carries cycle wheels 317, which are secured thereto (one for each desired row or column of control representations), having two sets of notches, each corresponding to the positions for the control representations in any given row or column of the film record, and these wheels make one complete revolution during the period required to advance two consecutive frames or sets of control representations past the sensing station. The "D" position of the wheels 317 is shown in Fig. 7.

On the shaft 316 are loosely mounted three arms 318, 319 and 320 to each of which is pivoted a spring actuated dog 321, 322 and 323, one end of which fits into any one of the notches in the wheel 317, and the other to project radially outward along the arm, and assuming, for the moment, that dog 321 in engagement with a notch in the wheel has been brought by the movement of the latter into engagement with the lever 324 while in its latched position, it is upset or thrown out of engagement with said wheel and stops in the position indicated in Fig. 7.

The movement of the parts is so timed that at the time a control representation of a given value is passing the sensing station to effect energization of the magnets 325, a notch in wheel 317 of corresponding value will be under the dog 321. The energization of said magnet will, therefore, permit the engagement of the dog with the notch in the wheel 317 which corresponds in value to the then passing control representation on the film record. If no control representation in a given row or column is on the film record, the K notch will be engaged by the dog under conditions to be hereinafter referred to. After engagement, the arm 318 is carried in the direction shown by the arrow and moving in unison with the wheel.

A cam wheel 326 is constantly rotated by suitable gearing (not shown) which may be cooperating with gear 315, and it has a number of teeth or points which knock back the lever 324 and relatch it before the next notch has come into position and before certain contacts D—1 and E—1, are operated. These contacts are operated by dogs 320—322 at different times during the machine cycle, depending upon which notches are engaged by the said dogs. The contacts are operated at the same instant in the cycle, by one of the dogs, that the correspondingly numbered index point position on the film record is passing the sensing station. For example, the dog 322 engaging notch "4" is effective to cause operation of the said contacts at the "4" index point position of the cycle, at which time the "4" index point positions on the film record are passing the sensing station.

Following the locked dog in its travel with the wheel 317, it reaches at a given time the contacts D—1 and E—1 and the end of the arm 318 engages a lever 327, operating these contacts, namely, closing contacts D—1 and opening contacts E—1. The said arm being still locked by its dog, continues its movement to the point in which dog 323 is shown, where it encounters a latch lever 328 and is thrown out of engagement with the wheel 317. Here it rests until a cam 329, revolved by suitable gearing in the machine unlatches lever 328 and allows the dog to engage with an S notch in the wheel 317 by which it is carried on to the starting point where it is again unlocked by the lever 324.

Considering now the other arms 319 and 320 and their dogs 322 and 323, each one goes through the same operations as described, but successively, that is to say, while dog 321 is unlocked and stationary, the arm 319 is being carried down to the contacts D—1 and E—1, and the dog 323 is being carried up to the latch 328, where it will rest until the S notch on the wheel comes under it, when it is tripped by the cam 329. Associated with the levers 324 and 328 are lock latches 330 which engage the arms after they have been freed from the wheel and prevent any backward movement of the same.

If no control spots were sensed in a given row or column, the corresponding magnet 325 would not be energized, and under these conditions, the uppermost dog 321 must be released to engage the K notch. This is effected by knockoff cam 331 rotated, by suitable gearing, so that the high point engages the latch lever 332 and withdraws it from engagement with the lever 324, once near the end of each cycle.

The cams 326, 329, and 331 referred to are driven by suitable gearing, which, in turn, can be driven by gear 315 (Fig. 2), or by a similar gear secured to shaft 316. The relative timing of the cams with respect to the operation of the wheels 317 and associated dogs 321 to 323 is set forth hereinabove.

*Operation of the machine*

Referring now to Figs. 10 and 10a (arranged as shown in Fig. 9), the different control circuits established by the analyzation of the controlling film record will be explained. Assuming that the film record has been positioned in the film advancing mechanism and also has been positioned in proper frame alignment, the line switches 300 are then closed to complete circuits to the drive motor 217 and the light source 210. Operation of the motor causes the various driving connections to rotate as described hereinabove. When the machine is in the normal "D" position (see Fig. 11), no control spots are present at the sensing station; therefore, the rays of light directed to the apertures in the guide plates 225 are conducted by the quartz rods to the associated light responsive cells 211 to activate them, controlling the amplifying units 212 so as to be conductive (assuming that the proper potentials are applied to the control elements of the amplifying units).

Figure 5:
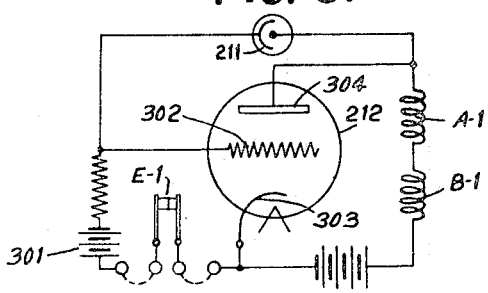
Fig. 5 shows a circuit arrangement of the electronic control device employed in the present invention.
Figure 6:
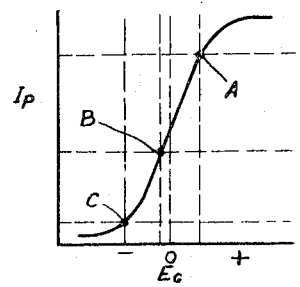
Fig. 6 shows graphically different output current values provided by the electronic device for particular values of voltage conditions impressed upon the control grid element of the device.
Figure 8:
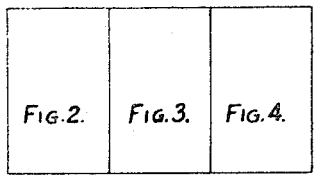
Figs. 8 and 9 show the layout arrangement of certain sheets of the drawings.

Referring now to Figs. 5 and 6, the operation of the amplifying units will be described. When no light rays are impinging on the light responsive cell 211 (and contacts E—1 are closed), the battery 301 is effective to bias the control grid element 302 so as to be at a negative potential with respect to the cathode element 303 to such a degree (see point C on the characteristic curve shown in Fig. 6) that substantially no current is flowing in the circuit connected to the anode element 304 including the relay coils A—1 and B—1. Under these conditions the relays A—1 and B—1 are not energized effectively to operate the associated contacts. It is realized now that whenever control spots are presented to the sensing station to interrupt the light rays, that is, to prevent the light rays to impinge on the related light responsive means 211, the described condition is created, namely, the flow of plate current in the output circuit of the related amplifying unit is reduced to such an extent that relays A—1 and B—1 are not energized effectively. However, when the light rays are not intercepted by control spots and are permitted to impinge on the light responsive cells, in each associated amplifying unit, the bias on the grid element is reduced, that is, the grid element is rendered positive with respect to the cathode, thereby permitting sufficient plate current to flow in the output circuit to effectively energize both relay coils A—1 and B—1, thus operating the contacts associated with said relays; the value of plate current flowing in the circuit under the last mentioned conditions is in excess of the value shown at point A on the curve in Fig. 6.

Until now, it was unnecessary to mention that the relays A—1 and B—1 are marginal relays and that relay A—1 operates only when the current value in the circuit exceeds the value A (Fig. 6) and that relay B—1 operates whenever the current value in the circuit exceeds the value B. It should be mentioned that contacts E—1 of the data storing means (Fig. 7) are connected in the grid bias circuit arrangement at all times by the plug connections as shown, and that when the said contacts are opened, the negative bias is removed from the grid element. Therefore, it is seen that in the event the light rays are intercepted so as not to impinge on the light responsive cell 211 and contacts E—1 are caused to be opened at exactly the same time interval, the grid potential is reduced to substantially a zero value, and thereby causing current flow in the output circuit equivalent in value to that designated in Fig. 6 by the intersection of the ordinate $E_G=0$ and the characteristic curve, the value of which is in excess of B but less than A, thus effectively energizing relay B—1 only and not relay A—1. However, if light rays impinge on cell 211 and contacts E—1 are conditioned to be either opened or closed at such times, the value of the current flow in the output circuit is in excess of A, thus effectively energizing both relays A—1 and B—1.

Now, assume that the start key is operated to close the associated contacts 305 (Fig. 10) to complete a circuit as follows: From one terminal of the supply source via conductor 306 through normally closed contacts 307 of the stop key, contacts 305, common conductor 308 through (1) the coil of relay R—1 to the other terminal of the supply source via conductor 309, energizing said relay; (2) the normally closed contacts R—6a through the film record advancing clutch magnet 229 to conductor 309, energizing said magnet, and (3) the normally closed contacts R—2b, and R—4a through the list control clutch magnet 272 to conductor 309, energizing said magnet. Energization of relay R—1 is effective to close the contacts R—1a and open the contacts R—1b; closing of contacts R—1a establishes a holding circuit for relay R—1 and control magnets 229 and 272 through the normally closed contacts 307 of the stop key and the film controlled contacts C—2 now closed and said contacts R—1a. Energization of the film advancing clutch magnet is effective to release the dog member 232 thereby causing the shafts 220 and 221 to rotate and advance the control spots on the film record to the sensing station. Film feeding continues as long as the said control magnet 229 remains energized. Energization of the list clutch magnet 272 is effective to release the control dog member 273 to rotate the printing cam 270 and operate the associated mechanism as long as the said list magnet remains energized. However, with switch 340 positioned as shown, and upon closure of contacts FC—2, near the end of the cycle, coil of relay R—4 is energized, causing contacts R—4a to open, thereby opening the described circuit to the list clutch magnet 272, and causing contacts R—4b to close to establish a holding circuit for the said relay, as follows: conductor 306, contacts R—6b and R—4b, switch 340 to coil of relay R—4 and conductor 309. The opening of the R—1b contacts prevents conditioning any circuits to effect resetting of the accumulator by operation of manually operated reset key, while the film advancing and printing means are operating.

Now that the machine is conditioned, as described, to render operative the various driving connections, the film feeding mechanism is effective to advance the differentially positioned control spots disposed on the film record to the sensing station for analyzation, and also, at the same time, the described driving connections are operated in synchronism with the film feeding means, so that upon conditioning of the control circuits, by the detection of the control spots, the sensed data are stored in the data storing means, for a machine cycle, which then, in turn, is effective to control the operations of the said accumulating and printing means at differential times to accumulate and/or print the data in accordance with the data designations sensed.

Upon presentation of the data designations to the sensing station, the light rays influencing the corresponding light responsive cells are intercepted or blocked so that the said cells 211 are effective at this time to condition the associated amplifying units 212 to be substantially non-conductive, or in effect, the plate current flowing in the output circuit is reduced to such a degree that the normally effectively energized relay coils included in the said circuits are not sufficiently energized to maintain the associated contacts in an open condition. Whenever the said relay coils are effectively energized, (this condition exists during the sensing period of the cycle whenever no control spots are presented to the sensing station) the contacts controlled thereby are opened. Therefore, upon starting the machine operations relay coils A—1 to A—6 and B—1 to B—6 included in part of the representative machine control circuits are effectively energized to open the associated control contacts.

Assume now, that the circuit diagram shown in Figs. 10 and 10a, is connected as shown in Fig. 12. With the machine connected in this manner, it will be shown that the amount data sensed on the records are accumulated as long as the classification data thereof are similar; and that, upon a change in classification data, film feeding operations are interrupted, whereupon total taking operations are automatically effected, followed by an automatic accumulator resetting operation, and resumption of the film feeding operations; and, that upon a group change ( i. e. a change in classification data on successive records), the classification data of each group of records are printed accordingly. In order to simplify the description, assume, that the data to be accumulated are represented by the control spots effective to condition the circuits including relays A—1 to 3 and B—1 to 3, and that the classification data are represented by the control spots effective to condition the circuits including relays A—4 to 6 and B—4 to 6.

Upon presentation of the first record to the sensing station, the relays A—1 to 6 and B—1 to 6 are not effectively energized at the differential times the control spots, representing the amount and classification data, are sensed, thereby causing the related contacts A—1a to 6a, and B—1a to 6a, to be closed.

Closures of contacts A—1a to 6a, cause circuits to be completed to the connected control magnets 325, of the data storing means, at the said differential times, causing the said dogs 321—323 to be released and engage the notches on the wheels 317, thereby storing the sensed data, for a machine cycle. The circuits referred to can be traced from conductor 306 to cam controlled contacts C—1, contacts A—1a to 6a, and by means of the indicated plug connections to the said control magnets 325, and conductor 309.

It is assumed, at this moment, that no previous data has been stored in the said data storing means. Closures of contacts B—4a to 6a cause the relay R—6 to be energized, and these circuits can be traced from conductor 306 to contacts FC—1, contacts B—4a to 6a, the indicated plug connections to coil of relay R—6, and conductor 309, causing the contacts R—6a and R—6b to open, and contacts R—6c and R—6d to close. A holding circuit is established for this relay by means of the normally closed contacts RC—2 and the said contacts R—6d, which is maintained until near the end of a reset cycle, when the said contacts RC—2 are opened. Opening of the contacts R—6a prevents further film feeding operations, since these contacts maintain magnet 229 deenergized. Opening of contacts R—6b breaks the holding circuit to relay R—4 to deenergize the said relay, thus permitting the magnet 272 to be energized through contacts R—4a to render the printing mechanism operative at the end of the cycle.

At the beginning of the following cycle, a total taking operation is effected through the now closed contacts R—6c, contacts (RC—3), emitter device 288—a and read-out device 252—a to energize the printing control magnets 214 to effect positioning of the typebars in accordance with the setting of the accumulator read-out device. An automatic resetting operation is then effected in the next cycle by means of the circuit conditioned by the LC—1 contacts during the total taking cycle, namely, conductor 306, contacts R—6c, LC—1, R—7b and coil of magnet 255 to conductor 309, to energize said magnet, which is effective to control the rotation of the reset shaft 263. During the reset cycle, (1) contacts RC—3 are opened to prevent any circuit to be completed through the emitter device 288—a, (2) contacts RC—2 are opened near the end of the cycle to deenergize relay R—6, and (3) contacts RC—1 are closed to energize relay R—7 to prevent further operation of the reset mechanism at the end of the cycle (for example, by depression of the reset key).

Deenergization of relay R—6 now permits magnet 229 to be energized through contacts R—6a so that at the end of the reset cycle, film feeding operations are effected. During the cycle immediately following the reset cycle, the accumlating mechanism and printing mechanism are operated in accordance with the data stored in the cycle wheels.

Now, upon resumption of the film feeding operations, the rotation of the cycle wheels 317 is also resumed. Therefore, during this cycle the D and E contacts are operated at differential times in accordance with the settings of the tripped dogs. It is recalled that the stored data corresponds to the data sensed on the first record. Consequently, the closures of the D—1 to D—3 contacts causes the control magnets 213 of the accumulator to be energized at differential times in accordance with the stored data, thereby effecting entries of this data therein. These circuits can be traced from conductor 306 to cam controlled contacts C—1, said contacts D—1 to D—3, plug connections as indicated to the control magnets 213, and conductor 309. Similar control circuits are established to energize the control magnets 214 of the printing unit upon closure of the contacts D—4 to D—6. In this manner, the amount data of the first record are entered into the accumulator, and the classification data thereof are recorded by the printing unit.

Also, upon resumption of the film feeding operations, the light responsive cells 211 are conditioned in accordance with the data designating control spots presented to the sensing station to effect the closures of the contacts A—1a to A—6a, accordingly, to control the operations of the data storing means as described.

It was mentioned, that the E contacts of the data storing means are connected, by means of the indicated plug connections, in the input circuits of the amplifying units 212. Therefore, as long as the classification data sensed on the records are in agreement with the classification data stored in the storing means, the contacts E—4 to E—6, controlled thereby, are opened at the same timed intervals that light is prevented from reaching the related cells 211 by the sensed control spots representing the classification data.

Under these conditions, the input circuits of the related amplifying units 212 are jointly controlled by the cells 211 and the E—4 to E—6 contacts, so that the values of the current flow in the associated output circuits are in excess of the value, indicated at B in Fig. 6. It is recalled, that when the said input circuits are controlled accordingly, the current in relays A—4 to A—6 is reduced to a point which permits their contacts to close, while the B—4 to B—6 relays remain effectively energized. Due to the closures of the said A—4 to 6 contacts the data storing means is controlled, as described, to set up and store the sensed classification data, and due to the energization of the said B—4 to 6 relays, the relay R—6 remains deenergized. Thus, as long as the classification data on successive records are in agreement, the film-feeding operations are continued, and the data sensed on the records, are entered, a cycle later, in the said accumulating means.

Near the end of the first cycle following the total taking and reset cycles, upon resumption of the film feeding operations, the FC—2 contacts are closed to effect energization of relay R—4, as described hereinabove. Opening of the contacts R—4a prevents energization of the control magnet 272, so that, as long as the classification data are in agreement, further printing operations are suppressed, even though the printing magnets are energized by the contacts D—4 to 6.

The operations just described continue until a change in the clasification data occurs, whereupon certain or all of the relays B—4 to 6 are deenergized, during the sensing operations, as mentioned hereinbefore, to effect energization of the relay R—6, and establish a holding circuit therefor, by means of the contacts RC—2 and R—6d until completion of the said resetting operations. Due to the operation of relay R—6, further film feeding operations are suppressed, and the total taking and resetting operations are initiated as described hereinbefore. Upon completion of these operations, film feeding operations are resumed precisely in the manner as set forth in the foregoing description. For examples of other types of control operations which can be exercised, by the system described hereinabove, reference should be made to the aforementioned copending application.

The usual manually operated keys and associated control circuits for initiating either total taking or resetting operations, or both, are provided, in the event, it is desired to effect such operations during the normal machine operations. The operations of these control circuits are well known, therefore, it is deemed that the following brief description is sufficient upon manual operation of the total key, the contacts 311 are closed to establish a circuit through contacts R—3a to energize relay R—2, and causing the associated contacts R—2a to be closed to effect energization of the printing control magnet 272, as described hereinabove. Printing operations are effected, which are followed by a resetting operation, which operations are under the control of the circuits traced in detail hereinabove. Upon manual operation of the reset key, the contacts 310 are closed to establish a circuit from conductor 306 to said contacts 310, contacts R—1b and R—7b to coil of magnet 255 and conductor 309, energizing said magnet to effect a resetting operation. During this resetting operation, contacts RC—1 are closed to effect energization of relay R—1 causing contacts R—1a to close and contacts R—7b to open. Opening of contacts R—7b causes the magnet 255 to be deenergized, thus preventing further resetting operations to be executed, in the event the reset key is held depressed for a prolonged time. Thus, it is seen that depression of the reset key for a prolonged period merely maintains a circuit from conductor 306 to contacts 310, contacts R—1b, contacts R—7a to relay R—7 and conductor 309. Upon release of the reset key the described circuit to relay R—7 is broken.

While there has been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, a sensing station, means for feeding thereto controlling elements having groups of classification data representations disposed thereon, means at the sensing station for sensing successively the groups of data representation, set-up devices and control means therefor, under control of the sensing means, for setting up successively the data represented on the controlling elements and presented to the sensing station, circuit control means operated by the said set-up devices, in accordance with the settings derived from one controlling element, at a time when the following controlling element is being sensed, electron discharge means having input and output circuits, circuit means controlled jointly by the sensing means and said circuit control means for influencing the said input circuit and controlling selectively the conductivity of the said discharge means in accordance with the agreement or disagreement of the data representations sensed on the said following controlling element at the sensing station and the data set up in the set-up devices, control means in the said output circuit selectively controlled by the said discharge means, and means controlled by the said control means for controlling the interruption of the normal feeding operations if the data sensed on the controlling element are unlike the data of the previous controlling element set up in the set-up devices, said last mentioned means rendering the feeding means effective to continue the feeding operations if the sensed data and the set-up data correspond.

2. The invention described in claim 1 in which the said sensing means comprises a source of light rays and light responsive means controlled by the light rays modified by the data representations.

3. In a machine of the class described, means for feeding controlling elements having groups of classification data representations disposed thereon, means for sensing successively the groups of data representations, set-up devices having means controlled by the sensing means for setting up successively the data represented on the sensed controlling elements, circuit control means operated by the said set-up devices, in accordance with the settings derived from one controlling element, at a time when the following controlling element is being sensed, electron discharge means having input and output circuits, a control grid included in the input circuit, circuit means controlled jointly by the sensing means and said circuit control means for impressing selectively predetermined bias conditions on the said control grid to control selectively the conductivity of the said discharge means in accordance with the agreement or disagreement of the data representations sensed on the said following controlling element and the data set up in the set-up devices, control means in the output circuit selectively controlled by the discharge means in accordance with the predetermined bias conditions impressed upon the grid thereof, and means controlled by the said control means for controlling the interruption of the feeding operations of the feeding means if the data sensed and set-up data are unlike and for rendering the feeding means effective to continue the feeding operations if the sensed data and set-up data correspond.

4. In a machine of the class described, means for successively feeding records bearing classification data designations, means for sensing the said designations on the records, data storing means having means controlled by the sensing means for storing successively the data sensed on said records, circuit control means operated by the said storing means, in accordance with the stored data derived from one record, at a time when the following record is being sensed, electron discharge means having input and output circuits, circuit means controlled jointly by the data sensing means and said circuit control means for controlling selectively the input circuit of the said discharge means in accordance with the agreement or disagreement of the data designations sensed on the said following record by the said sensing means and the data stored in the said storing means, thereby selectively controlling the conductivity of the electron discharge means, and means in the output circuit selectively controlled by the conductivity of the said discharge means in accordance with the agreement or disagreement of the sensed and stored data.

JAMES W. BRYCE.